(12) United States Patent
Bradley, IV

(10) Patent No.: US 8,078,378 B2
(45) Date of Patent: Dec. 13, 2011

(54) HILL START ASSIST SYSTEM

(75) Inventor: Abram McConnell Bradley, IV, Colfax, NC (US)

(73) Assignee: Volvo Group North America, Inc., Greensboro, NC (US)

( * ) Notice: Subject to any disclaimer, the term of this patent is extended or adjusted under 35 U.S.C. 154(b) by 496 days.

(21) Appl. No.: 12/319,141

(22) Filed: Dec. 31, 2008

(65) Prior Publication Data

US 2010/0168974 A1    Jul. 1, 2010

(51) Int. Cl.
*G06F 19/00* (2011.01)

(52) U.S. Cl. ............................. 701/70; 477/195; 303/5

(58) Field of Classification Search .................... 701/70; 303/5, 113.2, 192; 477/195, 203, 900, 901; 188/152, 355
See application file for complete search history.

(56) References Cited

U.S. PATENT DOCUMENTS

| | | | |
|---|---|---|---|
| 5,097,724 A | 3/1992 | Braun | |
| 5,342,119 A * | 8/1994 | Smith et al. | 303/113.2 |
| 5,472,223 A * | 12/1995 | Hawthorne et al. | 280/437 |
| 6,260,934 B1 * | 7/2001 | Lee | 303/192 |
| 7,226,389 B2 | 6/2007 | Steen | |
| 2008/0258540 A1* | 10/2008 | Hicks et al. | 301/111.01 |
| 2008/0271964 A1* | 11/2008 | Bennett et al. | 188/152 |
| 2010/0078278 A1* | 4/2010 | Hurlburt et al. | 188/355 |

FOREIGN PATENT DOCUMENTS

KR        2002028311     *   4/2002

* cited by examiner

*Primary Examiner* — Thomas Black
*Assistant Examiner* — Marthe Marc-Coleman
(74) *Attorney, Agent, or Firm* — Potomac Patent Group PLLC

(57) ABSTRACT

A hill start assist system for a tractor includes a pressure reduction valve receiving air from an air supply source, a solenoid valve having a supply port connected to a delivery port of the pressure reduction valve, a double check valve receiving air from a foot brake valve and from the solenoid valve, a tractor protection valve receiving air from the solenoid valve and from front and rear brake circuits of the tractor and an inversion valve having a control line connected to the solenoid, a supply port connected to the delivery line of the tractor protection valve, an exhaust port connected to the foot brake valve and a delivery line connected to a stop light switch.

20 Claims, 4 Drawing Sheets

3000

| E | C | S | D |
|---|---|---|---|
| 0 | 0 | 0 | 0 |
| 0 | 0 | 1 | 1 |
| 0 | 1 | 0 | 0 |
| 0 | 1 | 1 | 0 |
| 1 | 0 | 0 | 1 |
| 1 | 0 | 1 | 1 |
| 1 | 1 | 0 | 1 |
| 1 | 1 | 1 | 1 |

HILL START ASSIST SYSTEM

BACKGROUND

This invention relates to tractor-trailers and more particularly, to trailers that include a hill start assist function.

Tractor-type trucks are designed to tow trailers and semi-trailers having large loads. The loads may include goods, supplies or other freight. Some tractor trucks include an automated manual type transmission. This type of transmission presents a challenge to operators of the trucks when the truck has to accelerate from a stationary position on an incline.

In order to stop or maintain a stationary position (at a traffic light for example), the brakes are applied. When the truck has to accelerate from this position, the operator has to shift his or her foot from the brake pedal to the accelerator pedal. However, during this transition period, the truck has a tendency to roll back (if moving forward) as a result of the brakes being released since the driveline does not become engaged instantly upon a depression of the accelerator pedal. This rollback may be due to the incline (or grade) of the road, the load or weight of the truck or a combination thereof.

Hill start assist systems have been developed to prevent rolling back of the vehicle during the transition period. The present systems, however, do not provide adequate protection against the rolling back of a truck. Some systems only use brakes of the tractor portion of the truck to keep the truck from moving or rolling back. These systems do not use trailer brakes to assist in holding the truck in a stationary position on an incline. The brakes of the tractor may not be able or adequate to hold the tractor trailer combination on the grade. The brakes of the tractor may also wear out faster in these systems. In some situations (e.g. particular inclines), the present systems also do not keep even a tractor (without an attached trailer) from rolling back during this transition.

What is desired, therefore, is a hill start assist system that provides adequate protection against the rolling back of a truck that is transitioning from a stationary position.

SUMMARY

In one embodiment, a hill start system for a tractor is disclosed. The system comprises a pressure reduction valve receiving air from an air supply source, a solenoid valve having a supply port connected to a delivery port of the pressure reduction valve, a double check valve receiving air from a foot brake valve and from the solenoid valve, a tractor protection valve receiving air from the solenoid valve and from front and rear brake circuits of the tractor and an inversion valve having a control line connected to the solenoid, a supply port connected to the delivery line of the tractor protection valve, an exhaust port connected to the foot brake valve and a delivery line connected to a stop light switch.

In another embodiment, a method of activating a hill start assist function in a vehicle is disclosed. The method comprises a transmission electronic control unit (T-ECU) instructing an anti lock braking system electronic control unit (ABS ECU) to activate the hill start assist function, the ABS ECU transmitting an electrical signal to a solenoid valve, the solenoid valve delivering air from a pressure reduction valve to each of a double check valve, a supply line of a tractor protection valve and a control line of an inversion valve, the double check valve delivering air to rear axle module to activate rear brakes of the trailer, the tractor protection valve providing air to a supply line of the inversion valve and to glad hands associated with a trailer attached to the tractor and the inversion valve selectively delivering air to a stop light switch based on status of a foot pedal.

BRIEF DESCRIPTION OF THE DRAWINGS

FIG. 3 illustrates a state table of an exemplary inversion valve utilized in a hill start assist system according to exemplary embodiments.

DETAILED DESCRIPTION

The following description of the implementations consistent with the present invention refers to the accompanying drawings. The same reference numbers in different drawings identify the same or similar elements. The following detailed description does not limit the invention. Instead, the scope of the invention is defined by the appended claims.

Figure 1:
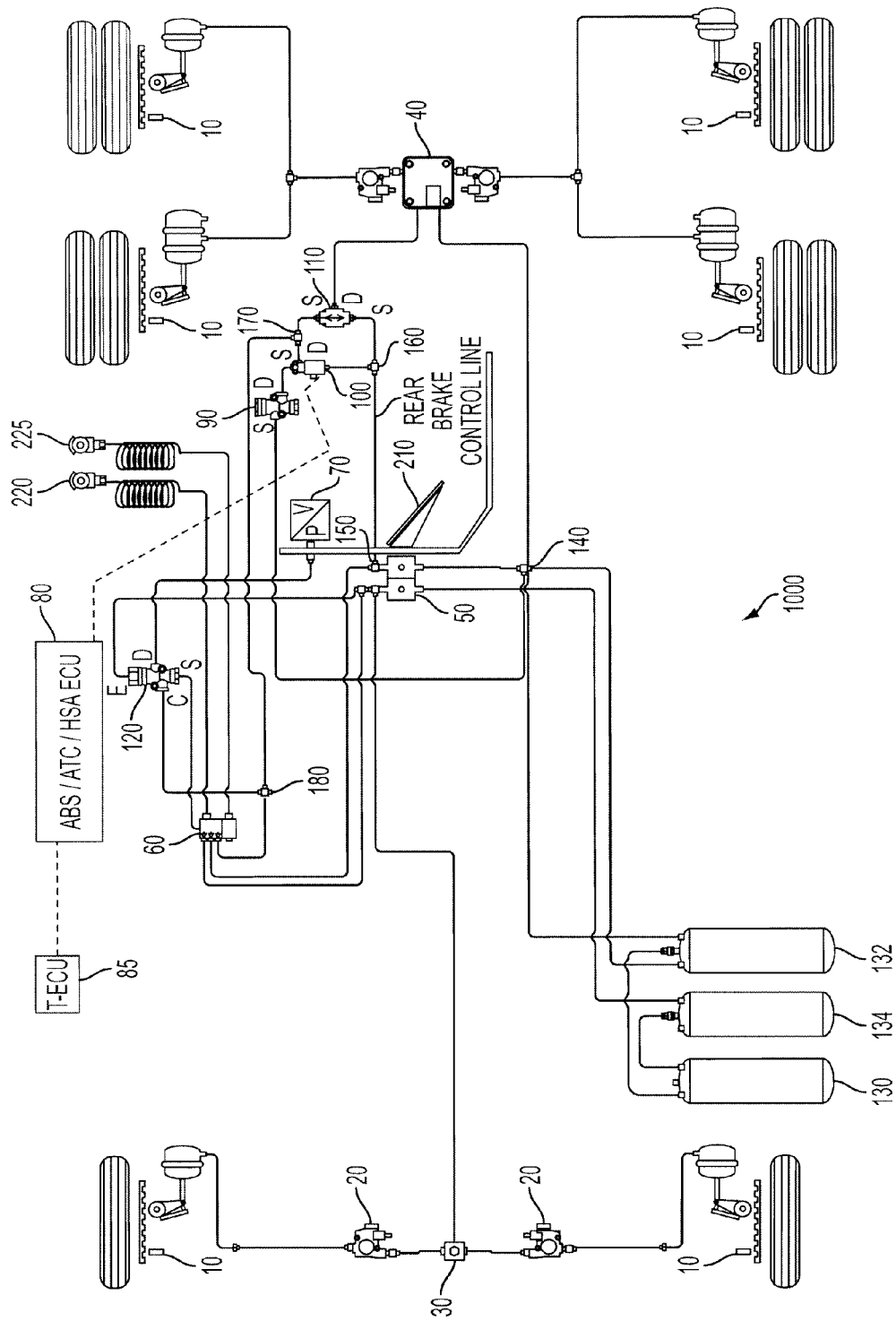
FIG. 1 illustrates a hill start assist system according an exemplary embodiment.

According to exemplary embodiments, a hillstart assist system is disclosed. A hillstart assist system 1000 in accordance with an exemplary embodiment is illustrated in FIG. 1.

Hillstart assist system 1000 (HSA) may include (among other elements) wheel speed sensors 10 for each of the six wheel(s) of a tractor, front (brake) ABS (anti locking braking system) modulators 20, a quick release valve 30, rear axle module 40, foot brake valve 50, tractor protection valve 60, stop light switch 70, ABS ECU (electronic control unit) 80, transmission ECU (T-ECU) 85, pressure reduction valve 90, solenoid valve 100, double check valve 110, inversion valve 120, air tanks 132-136, tee connections 140-180, foot pedal 210 and glad hands 220 and 225.

Air tank 130 may be an air supply tank which may provide compressed (or pressurized) air generated by an air compressor (not shown) to primary tank 132 and to secondary tank 134. The air from the secondary tank may be used for controlling the front brakes (i.e. drive axle) of the tractor and that from the primary tank may be used for controlling the rear brakes (i.e. steer axle) of the tractor. The pressure in tanks 130, 132 and 134 may be in the range of 110 to 135 psi (pounds per square inch).

For the valves illustrated, where appropriate, "S" designates supply port/line, "D" designates delivery port/line, "C" designates control port/line and "E" designates exhaust port/line. The terms "line" and "port" may be used interchangeably.

For inversion valve 120, the state of the supply line (S), control line (C) and exhaust line (E) determine the delivery (D). The exhaust port may be connected to the foot brake valve 50 and may exhaust through the rear brake circuit of the foot brake valve: The exhaust port of inversion valve 120 permits air flow both into the valve and out of the valve. Inversion valve 120 may be the TR-3 Inversion Valve available from Bendix™ Commercial Vehicle Systems L.C of Elyria, Ohio for example.

If air is supplied via the control line to inversion valve 120, it may be referred to as a control signal being on (to the inversion valve 120) within the control line. Air is delivered from inversion valve 120 when the supply line is "on", the control signal is "off" and the exhaust line is "off" (i.e. no air flows from the foot brake valve 50 into the inversion valve 120). Air is not delivered from the inversion valve when the supply line is "on", the control signal is "on" and the exhaust line is "off". No delivery takes place when the supply line is "off" regardless of the control signal while the exhaust line is "off". In this state (i.e. exhaust line is "off"), any air in the delivery line is exhausted to atmosphere via the foot brake valve 50.

If the brakes are applied (by depressing foot pedal 210 for example), air is delivered from the foot brake valve 50 to the exhaust port of the inversion valve 120 (exhaust line is "on"), allowing air to be delivered from the inversion valve 120 regardless of the control signal status. A state table 3000 for inversion valve 120 is illustrated in FIG. 3 in which 1 represents an "on" status and 0 represents an "off" status.

Double check valve 110 may be viewed as having two supply lines and one delivery line. Air from the supply line having the higher pressure is delivered by double check valve 110.

During vehicle operation, communication takes place between T-ECU 85 and ABS ECU 80. Among the information that is conveyed by T-ECU 85 to ABS ECU 80 may be incline and speed values for example. This incline may represent the gradient of the vehicle (or grade at which the vehicle is located). T-ECU 85 may instruct ABS ECU 80 to activate the hill start assist function when the vehicle comes to a stop or is in a stationary position (e.g. via the operator applying a brake and/or the speed or velocity of the vehicle is zero) while on an incline. This may occur primarily when the vehicle is moving in a forward on an incline or hill (i.e. nose of the vehicle is higher than the tail of the vehicle). In response, ABS ECU 80 sends an electrical signal to solenoid 100 (illustrated by the dashed line between ECU 80 and solenoid 100).

Pressurized air may be supplied from primary tank 134 to both the foot brake valve 50 and to pressure reduction valve 90 (via tee connection 140) as well as to rear axle module 40 (i.e. the brake circuit lines are pressurized). The pressure of the air from secondary tank 134 is reduced by valve 90 and supplied at the lowered pressure to solenoid valve 100. Pressure reduction valve 90 may reduce the air pressure from the 110 to 135 psi range to 55 psi in some embodiments. When the vehicle brakes are activated via foot pedal 210, air is supplied from foot brake valve 50 (via tee connection 160) to double check valve 110 and to tractor protection valve 60. As a result of the electrical signal described above, the air with the lowered pressure from reduction valve 90 is also delivered by solenoid valve 100 (via tee connection 170) to double check valve 110.

The double check valve 110 compares the pressures delivered from the solenoid valve 100 and the foot brake valve 50, and delivers air from the source having a higher pressure to the rear axle module 40 to activate the drive axle brakes. The air pressure from foot brake valve 50 is proportional to the amount pedal 210 is depressed. Pressure of air from foot brake valve 50 may be higher than the pressure of air from solenoid valve 100 in some instances and lower in other instances. Pressure from solenoid valve 100 may be constant (e.g. 55 psi).

Air from solenoid 100 is also supplied (via tee connection 170 and 180) to tractor protection valve 60 and to inversion valve 120. Tractor protection valve 60 is a triple check valve that permits air having the highest pressure from among three supply lines to be delivered. When the brakes are activated (and hill start assist is also activated), the air from the front and rear circuits of foot brake valve 50 and air from solenoid 100 are delivered to tractor protection valve 60. Tractor protection valve 60 compares the air pressures and delivers the highest of the three pressures to activate brakes associated with a trailer (not illustrated) via service brake glad hands 220. The pressure of air from solenoid 100 may be at a constant pressure while that from the front and rear brake circuits may be proportional to the amount that pedal 210 is depressed.

Air from tractor protection valve 60 is provided as a supply signal to inversion valve 120. Control signal to inversion valve 120 may be on (from solenoid 100 via tee connection 170 and 180). Since the exhaust is pressurized by the foot brake valve 50 (i.e. with exhaust being 1, delivery is 1 as illustrated in FIG. 3), this air is delivered from inversion valve 120 to the stop light switch 70.

When the operator deactivates the brakes (removing pressure on the pedal 210 for example) and applies pressure to the accelerator pedal (not illustrated) to move the vehicle from the stationary position (while still on an incline in this exemplary embodiment), the hill start assist system is still activated (i.e. T-ECU 85 has not instructed ABS ECU 80 to deactivate the hill start assist system) and prevents the vehicle from moving (or, rolling) backward before the drive line is engaged as described below.

Once the brakes are released via foot pedal 210, air from foot brake valve 50 is exhausted and is no longer supplied to double check valve 110 (via tee connection 160). However, since the hill start system remains active (i.e. T-ECU 85 has not instructed ABS ECU 80 to deactivate the hill start assist system), the electrical signal from ABS ECU 80 to solenoid 100 remains on. Air from primary tank 134 is supplied to solenoid 100 through pressure reduction valve 90. Solenoid valve 100 delivers this air to double check valve 110 which delivers it to the rear axle module to prevent the vehicle from moving (or, rolling) backward.

Since the foot pedal 210 is no longer depressed, no air is supplied to the tractor protection valve 60 from the foot brake valve 50. Air is supplied to tractor protection valve 60 from solenoid 100. As described above, tractor protection valve 60 compares the air pressures and delivers the highest of the three pressures (in this case, air from solenoid 100) to activate brakes associated with a trailer (not illustrated) via glad hands 220.

Air from tractor protection valve 60 is also provided to the supply line of inversion valve 120. Air from solenoid 100 is provided (via tee connections 170 and 180) to the control line of inversion valve 120 (i.e. control signal to inversion valve 120 is "on").

Since the foot pedal 50 is released, air in the exhaust line is released (away from the inversion valve); that is, the exhaust line is not providing air to inversion valve 120. Since both the supply signal and control lines to inversion valve 120 are on (from tractor protection valve 60 and solenoid valve 100 respectively) and exhaust line is off, there is no delivery from inversion valve 120 to the stop light switch 70. Any air between the stop light switch 70 and inversion valve 120 is exhausted through the inversion valve exhaust port to the foot brake valve, and out of the foot brake valve exhaust port.

As describe above, while the hill start assist system is on, the brakes are still activated. However, the transmission may interfere with engagement of the drive line if it senses that the vehicle is in a stationary position while the vehicle is in the transition phase. The transmission may prevent the drive line from being engaged. This results in a sort of "jerky" movement of the vehicle. This condition may be avoided if stop light switch 70 is controlled by inversion valve 120 in the manner described above.

As the vehicle drive line becomes engaged, T-ECU 85 instructs the ABS ECU 80 to disengage or deactivate the hill start assist system. The electrical signal from ABS ECU 80 to solenoid 100 may be turned off and air is not delivered to any one of the following: double check valve 110, tractor protection valve 60 and inversion valve 120. There is no air being supplied to rear axle module 40 and to service glad hands 220 associated with the trailer brakes. Deactivation of the hill start assist system exhausts the air from the control port of inversion valve 120 which allows the inversion valve supply port ("off" or 0) to open to the delivery port and to the stop light switch 70 (i.e. there is no delivery from inversion valve 120 to the stop light switch). The vehicle engages in forward movement at this point.

Figure 2:
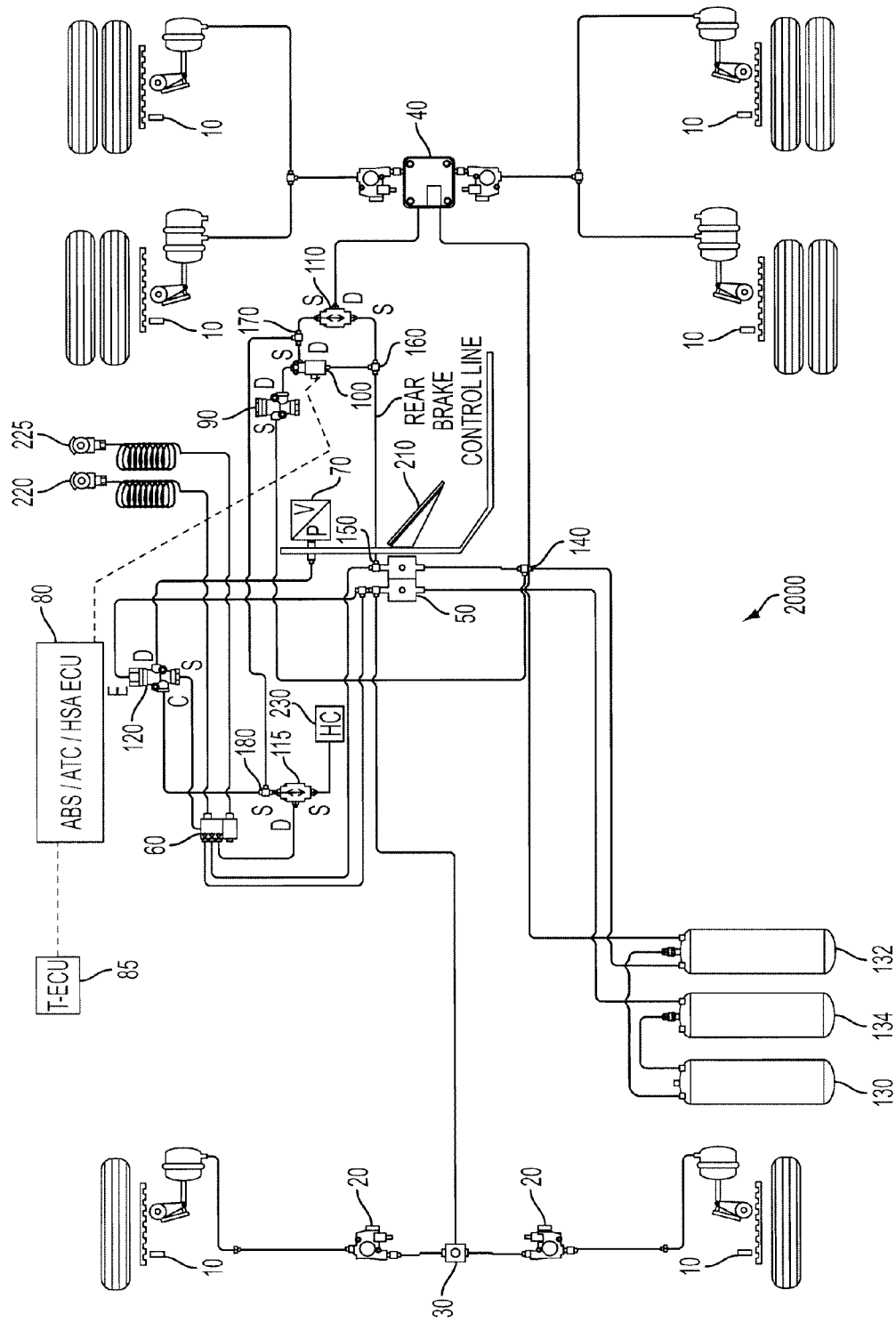
FIG. 2 illustrates a hill start assist system according to another exemplary embodiment.

A hill start assist system 2000 in accordance with another exemplary embodiment is illustrated in FIG. 2. Hill start assist system 1000 described with reference to FIG. 1 may be implemented in vehicles (i.e. trucks) without a hand control that facilitates manual activation (and deactivation) of trailer brakes. Hill start assist system 2000, on the other hand, may be implemented in truck's having such hand controls.

In addition to the elements illustrated and described with reference to hill start assist system 1000 of FIG. 1, hill start assist system 2000 also includes a double check valve 115 and hand control 230. As with the hill start assist system 1000 of FIG. 1 above, when the vehicle brakes are activated via foot pedal 210, air is supplied from foot brake valve 50 (via tee connection 160) to double check valve 110 and to pressure reduction valve 90. As a result of the electrical signal described above (from ABS ECU to solenoid 100 in response to instructions from the T-ECU 85 to ABS ECU 80), the air with the lowered pressure from reduction valve 90 is delivered by solenoid valve 100 (via tee connection 170) to double check vale 110. The double check valve 110 compares the pressures delivered from the solenoid valve 100 and the foot brake valve 50. The air pressure from foot brake valve 50 is proportional to the amount that the pedal is depressed. Accordingly, the pressure of air from solenoid valve 100 may be higher than pressure of air from foot brake valve 50 in some instances and lower in other instances. Double check valve 110 delivers the higher of these two air pressures to rear axle module 40 to activate the drive (i.e. rear) axle brakes.

Air from solenoid 100 is also provided (via tee connection 170 and 180) to (a second) double check valve 115 and as a control signal to inversion valve 120. A second supply line of double check valve 115 is connected to hand control 230. If the hand control is activated (by the operator of the truck for example), it supplies air to double check valve 115. Double check valve 115 compares pressure of air from solenoid 100 and from hand control 230. Pressure of the air from hand control 230 is proportionate to how far the handle is pulled. Accordingly, pressure of air from hand control 230 may be higher than the pressure of air from solenoid valve 100 in some instances and lower in other instances. The air with the higher pressure from double check valve 115 is delivered to tractor protection valve 60.

Tractor protection valve 60 is a triple check valve that permits air having the highest pressure from among three supply lines to be delivered. When the brakes are activated, the air from the front and rear circuits of foot brake valve 50 and from double check valve 115 are delivered to tractor protection valve 60. Tractor protection valve 60 compares the air pressures and delivers the highest of the three pressures to activate brakes associated with a trailer (not illustrated) via service brake glad hands 220.

Air from tractor protection valve 60 is provided as a supply signal to inversion valve 120. Since the exhaust port of the inversion valve is pressurized by foot brake valve 50, this air is delivered from inversion valve 120 to the stop light switch 70. In some embodiments, hand control 230 may also pressurize the exhaust port of the inversion valve (not illustrated). In this case, a (third) double check valve may have its supply lines connected to the foot brake valve and the hand control and a delivery line connected to the exhaust port of the inversion valve. This double check valve may then pressurize the exhaust port of the inversion valve.

When the operator deactivates the brakes (e.g. removing pressure on the pedal 210) and applies pressure to the accelerator pedal (not illustrated) to move the vehicle from the stationary position (while still on an incline in this exemplary embodiment), the hill start assist system remains activated (i.e. T-ECU 85 has not instructed ABS ECU 80 to deactivate the hill start assist system) and prevents the vehicle from rolling back before the drive line is engaged.

Once the brakes are released via foot pedal 210, air from foot brake valve 50 is exhausted and is no longer supplied to double check valve 110 (via tee connection 160). However, the hill start assist system remains active (i.e. T-ECU 85 has not instructed ABS ECU 85 to deactivate the hill start assist system) and the electrical signal from ABS ECU 80 to solenoid 100 remains on. Air from primary tank 134 is supplied to solenoid 100 through pressure reduction valve 90 and delivered to double check valve 110. The pressure of air from solenoid 100 is higher (since no pressure is present from the foot valve) and this is delivered to the rear axle module to prevent the vehicle from moving (or, rolling) backward.

Air from solenoid 100 is also supplied (via tee connections 170 and 180) to double check valve 115 and as a control signal to inversion valve 120. Double check valve 115 provides air with a higher of two pressures between the solenoid 100 and hand control 230 to tractor protection valve 60. Tractor protection valve 60 delivers air having the highest pressure from the three sources highlighted above (in this case, air from double check valve 115) to activate brakes associated with a trailer (not illustrated) via service brake glad hands 220.

Air from tractor protection valve 60 is provided as a supply signal to inversion valve 120. Control signal to inversion valve 120 is on (from solenoid 100 via tee connections 170 and 180).

Since the foot pedal 50 is released, air in the exhaust line is released (away from the inversion valve); that is, the exhaust line is not providing air to inversion valve 120. Signal and control lines to inversion valve 120 are on (from tractor protection valve 60 and solenoid valve 100 respectively) and there is no delivery from inversion valve 120 to the stop light switch 70. Any air between the stop light switch 70 and inversion valve 120 is exhausted through the inversion valve exhaust port to the foot valve, and out the foot valve exhaust port.

As the vehicle drive line becomes engaged, T-ECU 85 instructs ABS ECU 80 to disengage or deactivate the hill start assist system. The electrical signal from ABS ECU 80 to solenoid 100 may be turned off and air is not delivered to any one of the following: double check valves 110 and 115, tractor protection valve 60 and inversion valve 120. There is no air being supplied to rear axle module 40 and to service glad hands 220 associated with the trailer brakes. Deactivation of the hill start assist system exhausts the air from the control port of inversion valve 120 which allows the inversion valve supply port ("off" or 0) to open to the delivery port and to the stop light switch 70 (i.e. there is no delivery from inversion valve 120 to the stop light switch). The vehicle engages in forward movement at this point.

In some embodiments, an "override" function may be implemented to provide the operator of the vehicle with an ability to manually disengage the hill start assist functionality. When the hill start functionality is activated, it may be indicated on the instrument cluster in the dashboard of the vehicle. The override switch or sensor may be located within the reach of the operator. The override switch, when activated, may override the instruction from T-ECU 85 to ABS ECU 80 (that instructs the ABS ECU 80 to activate the hill start function). The override activation may instruct ABS ECU 80 to deactivate the hill start assist functionality. The override function may be limited to being effective for a predetermined period of time for example.

Figure 4:
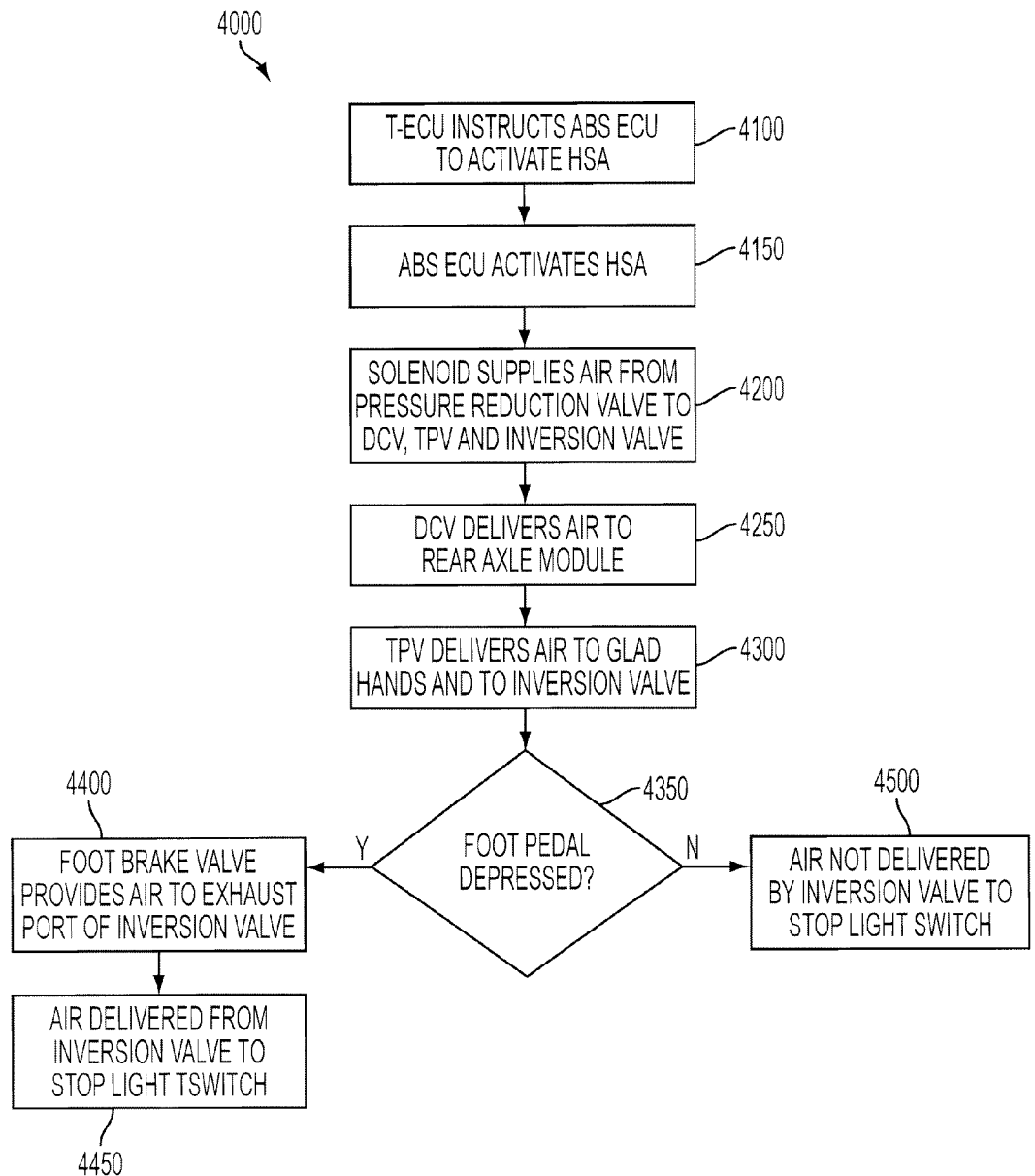
FIG. 4 illustrates a method in accordance with exemplary embodiments.

An exemplary method (or process) 4000 for activating a hill start assist (HSA) function (in system 1000 of FIG. 1) may be described with reference to FIG. 4. T-ECU 85 may instruct ABS ECU 80 to activate HSA at 4100. This instruction may be based on evaluating vehicle conditions such as speed/velocity and incline. The vehicle speed may be zero (stationary position resulting from braking for example) and the vehicle may be on an incline. In response, ABS ECU 80 may transmit an electrical signal to solenoid 100 at 4150. Solenoid 100 may deliver air from pressure reduction valve 90 to double check valve 110, to tractor protection valve 60 and to (the control line of) inversion valve 120 at 4200.

The double check valve (DCV) 110 may deliver air to rear axle module to activate rear brakes of the trailer at 4250. Double check valve 110 may deliver air from either the solenoid valve 100 or from foot brake valve 50 based on which of these sources provides air with the higher pressure. Tractor protection valve 60 (TPV) may deliver air (from the source having the highest pressure between front brake circuit, rear brake circuit and solenoid) to glad hands 220 and (to the supply line of) inversion valve 120 at 4300. Glad hands 220 may be associated with trailer brakes and the air from the tractor protector valve may activate the trailer brakes.

If foot pedal 210 is depressed as determined at 4350, air may be provided (by foot brake valve 50) to inversion valve 120 via the exhaust port at 4400. Air may be delivered from inversion valve 120 to stop light switch 70 at 4450. If foot pedal 210 is released or not depressed, inversion valve does not deliver air to stop light switch 70 at 4500. The air in the line between inversion valve and stop light switch is released via the exhaust port of the inversion valve. Inversion valve 120, therefore, selectively provides air to stop light switch based whether the foot pedal is depressed or not depressed.

If a hand control 230 is included in the system (such as system 2000 of FIG. 2), solenoid valve provides air from reduction valve to a second double check valve 115 (instead of providing air to tractor protection valve) which also receives air from the hand control 230. Double check 115 valve may provide air to tractor protection valve 60 in this exemplary embodiment.

As described above, the hand control may also pressurize the exhaust port of the inversion in some embodiments. In such an arrangement, inversion valve may selectively provide air to stop light switch 70 based on whether either the foot brake valve 50 or hand control 230 is depressed or activated.

While the exemplary description has been directed to forward movement of the truck on an incline, it is equally applicable (i.e. hill start function activated) when a vehicle is moving backward on a decline (i.e. nose of the vehicle is lower than the rear of the vehicle) to prevent rolling forward.

Exemplary embodiments as described may be equally applicable to tractors (without trailers). If no trailer is attached to the tractor, glad hands 220 (and 225) will be closed or sealed to prevent air or pressure loss.

Tractor protection valve 60 may be a triple check valve or can also be replaced by multiple double check valves. The terms "truck" and "vehicle" have been used interchangeably.

It will be appreciated that the procedures (arrangement) described above may be carried out repetitively as necessary to control a vehicle. To facilitate understanding, many aspects of the invention are described in terms of sequences of actions. It will be recognized that the various actions could be performed by a combination of specialized circuit and mechanical elements.

Thus, the invention may be embodied in many different forms, not all of which are described above, and all such forms are contemplated to be within the scope of the invention. It is emphasized that the terms "comprises" and "comprising", when used in this application, specify the presence of stated features, steps, or components and do not preclude the presence or addition of one or more other features, steps, components, or groups thereof.

The particular embodiments described above are merely illustrative and should not be considered restrictive in any way. The scope of the invention is determined by the following claims, and all variations and equivalents that fall within the range of the claims are intended to be embraced therein.

What is claimed is:

1. A hill start assist system for a tractor comprising:
   a pressure reduction valve receiving air from an air supply source;
   a solenoid valve having a supply port connected to a delivery port of the pressure reduction valve;
   a double check valve receiving air from a foot brake valve and from the solenoid valve;
   a tractor protection valve receiving air from the solenoid valve and from front and rear brake circuits of the tractor; and
   an inversion valve having a control line connected to the solenoid, a supply port connected to the delivery line of the tractor protection valve, an exhaust port connected to the foot brake valve and a delivery line connected to a stop light switch.

2. The hill start assist system of claim 1, wherein the air supply source is an air supply tank containing pressurized air.

3. The hill start assist system of claim 2, wherein the air is pressurized between 110 and 135 pounds per square inch (psi).

4. The hill start assist system of claim 3, wherein the pressure reduction valve reduces the air pressure to 55 psi.

5. The hill start assist system of claim 1, wherein air is supplied by the solenoid to the double check valve based on an electrical signal received by the solenoid from an anti lock braking system electronic control unit (ABS ECU).

6. The hill start assist system of claim 5, wherein the ABS ECU transmits the electric signal to the solenoid in response to an instruction received from a transmission ECU (T-ECU) of the tractor.

7. The hill start assist system of claim 6, wherein the T-ECU instructs the ABS ECU based on monitoring vehicle conditions including at least one of vehicle speed and incline.

8. The hill start assist system of claim 5, wherein the electrical signal to the solenoid indicates activation of the hill start assist function.

9. The hill start assist system of claim 1, wherein the double check valve delivers air to rear brake axles to activate rear brakes of the tractor.

10. The hill start assist system of claim 1, wherein delivered air is from a source having a higher pressure.

11. The hill start assist system of claim 1, wherein the tractor protection valve supplies air to glad hands associated with brakes of a trailer.

12. The hill start assist system of claim 1, wherein the inversion valve delivers air to the stop light switch when air from foot brake valve is provided to the inversion valve via an exhaust port of the inversion valve.

13. The hill start assist system of claim 1, wherein the inversion valve does not deliver air to the stop light switch when air from foot brake valve is not provided to the inversion valve and air is provided by the solenoid valve to a supply line of the tractor protection valve and to a control line of the inversion valve.

14. A method of activating a hill start assist function in a vehicle comprising:
- a transmission electronic control unit (T-ECU) instructing an anti lock braking system electronic control unit (ABS ECU) to activate the hill start assist function;
- the ABS ECU transmitting an electrical signal to a solenoid valve;
- the solenoid valve delivering air from a pressure reduction valve to each of a double check valve, a supply line of a tractor protection valve and a control line of an inversion valve;
- the double check valve delivering air to rear axle module to activate rear brakes of the trailer;
- the tractor protection valve providing air to a supply line of the inversion valve and to glad hands associated with a trailer attached to the tractor; and
- the inversion valve selectively delivering air to a stop light switch based on status of a foot pedal.

15. The method of claim 14, wherein the T-ECU provides the instruction to the ABS ECU based on evaluating vehicle condition including speed and an incline at which the vehicle is located.

16. The method of claim 14, wherein the vehicle is moving forward on an incline.

17. The method of claim 14, wherein the vehicle is moving backward on an incline.

18. The method of claim 14, wherein the inversion valve provides air to the stop light switch when the foot pedal is depressed.

19. The method of claim 14, wherein the inversion valve does not provide air to the stop light switch when the foot pedal is not depressed.

20. The method of claim 14, wherein the solenoid valve delivers air from the reduction valve at a constant pressure.

* * * * *